April 19, 1949.     E. C. KRUEGER     2,467,674
TOOL GRINDER

Filed May 26, 1947     2 Sheets-Sheet 1

INVENTOR.
Edward C. Krueger
BY
Attorney.

April 19, 1949.　　　　E. C. KRUEGER　　　　2,467,674
TOOL GRINDER
Filed May 26, 1947　　　　　　　　　　　2 Sheets-Sheet 2
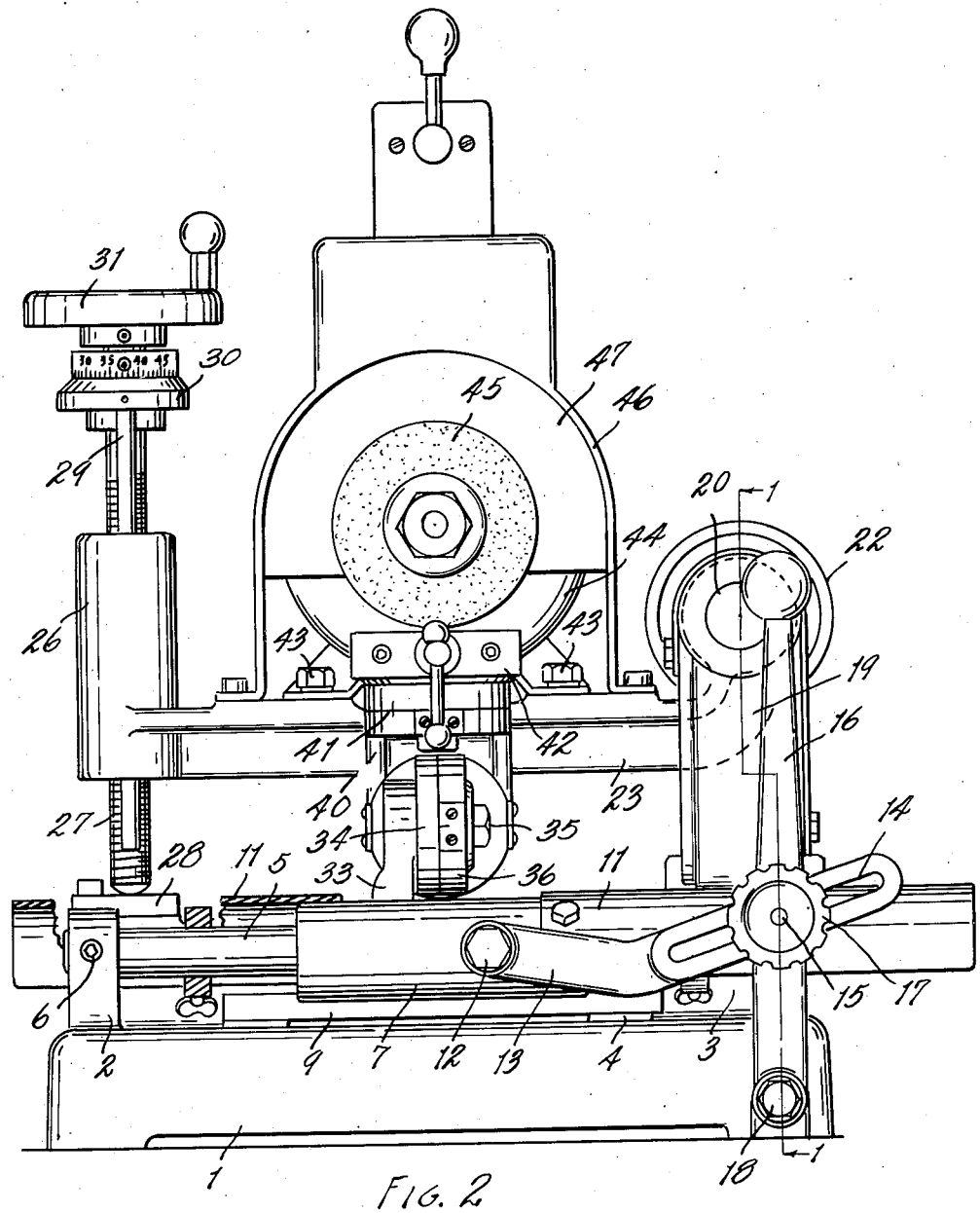
FIG. 2
INVENTOR.
Edward C. Krueger
BY
Attorney.

Patented Apr. 19, 1949

2,467,674

UNITED STATES PATENT OFFICE 2,467,674

TOOL GRINDER

Edward C. Krueger, Otsego, Mich., assignor to Hammond Machinery Builders, Inc., Kalamazoo, Mich.

Application May 26, 1947, Serial No. 750,455

6 Claims. (Cl. 51—92)

This invention relates to improvements in a tool grinder.

The principal objects of this invention are:

First, to provide a tool grinder in which the tool holding vise may be universally adjusted to any angular position relative to the grinding wheel.

Second, to provide a tool grinder in which the grinding wheel and driving motor are adjustably mounted for movement transversely and vertically with respect to the tool holder to obtain very fine and accurate adjustments of the grinding wheel.

Third, to provide a tool grinder in which the tool holding mechanism is easily reciprocated relative to the grinding wheel to pass the work through successive grinding operations.

Fourth, to provide a machine for grinding or cutting operations on a work piece in which the work piece may be held in a plurality of universally adjustable positions and in which the grinding or cutting tool is adjustable in two planes relative to the work piece.

Fifth, to provide a machine having the operating characteristics referred to above which may be inexpensively manufactured and assembled and which will still hold the work piece and grinding or cutting member in accurately maintained relative positions.

Other objects and advantages relating to the details and economies of the invention will be apparent from the following description and claims.

The drawings, of which there are two sheets, illustrate a preferred form of my tool grinder.

Fig. 2 is an end elevational view partially broken away in cross section of the machine as illustrated in Fig. 1.

Figure 1:
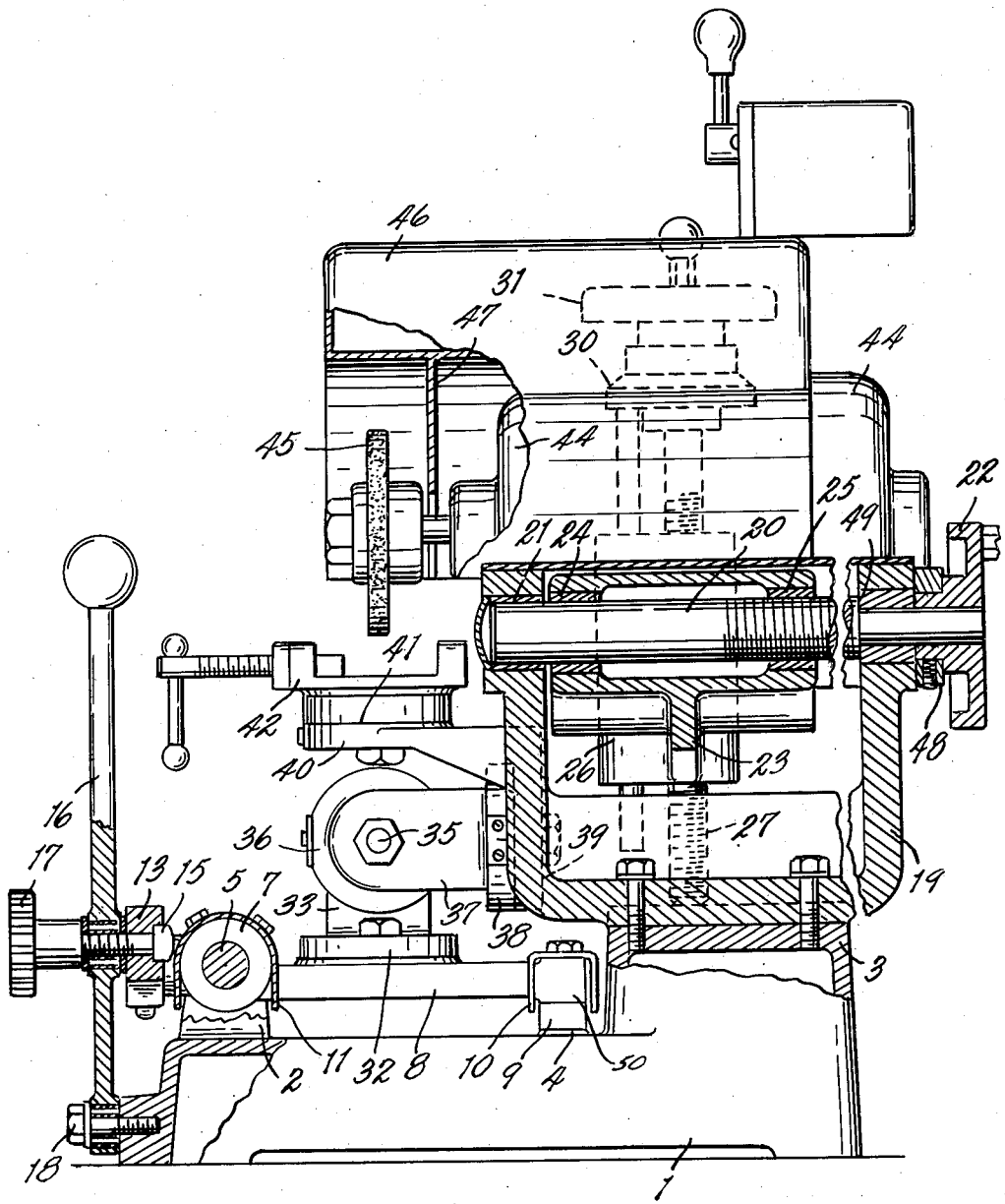
Fig. 1 is a front elevational view of my grinder partially broken away in vertical cross section along the line I—I in Fig. 2.

The machine of the invention consists of a base I which is preferably of cast metal construction and which is provided with a pair of longitudinally spaced upstanding ears 2 along the left side thereof and a pedestal 3 raised above the right side thereof. A pair of longitudinally spaced bosses 4 are formed on the base along the inner side of the pedestal 3.

The ears 2 define coaxial apertures arranged to receive a guide rod 5 which is held in place in the ears by appropriate set screws 6, one of which is illustrated in Fig. 2. The guide rod 5 is passed through and slidably supports a sleeve 7 formed along the left side of a carriage 8 most clearly illustrated in Fig. 1. The bosses 4 support a longitudinally extending slide rail 9, the upper surface of which is arranged to slidably support a shoe portion 50 on the right end of the carriage 8. Dust shields 10 are secured to the shoe portion of the carriage and overhang the slide rail 9 to prevent the accumulation of chips and grinding dust on the slide rail and similar shields 11 are secured to each end of the sleeve 7 and project over the guide rod 5 and the ears 2 to prevent the accumulation of grinding dust on the guide rod.

The sleeve 7 is pivotally connected at 12 to a link 13 defining an elongated slot 14. The slot 14 is arranged to pass the shank of a bolt 15 releasably clamped to an operating lever 16 by the hand wheel 17. The operating lever 16 is pivotally connected at 18 to the side of the base 1.

Secured to the top of the pedestal portion 3 of the base and extending transversely of the machine is an upwardly opening yoke 19, the arms of which are apertured to form aligned bearings for a pivot shaft 20. Bushings 21 are positioned between the shaft and the yoke and the shaft is provided with a hand wheel 22 on the right end thereof by means of which the shaft may be rotated in the yoke. The shaft is held against axial movement relative to the yoke 19 by the hub of the hand wheel and the shoulder 49. The ring 48 is graduated to indicate axial motion of the arm 23.

The pivot shaft 20 rotatably supports the forward end of a grinder support arm 23, the arm 23 preferably being formed as a casting having a hollow forward end defining aligned apertures through which the pivot shaft extends. A bushing 24 rotatably supports the left side of the grinder arm on the pivot shaft while a threaded nut 25 is pressed fitted into the right side of the arm 23 and engaged with threads formed on the pivot shaft. Thus the grinder support arm is tiltable about the pivot shaft as an axis and is slidable axially along the pivot shaft when the hand wheel 22 is turned to turn the threads on the shaft within the nut 25.

The rear end of the grinder support arm 23 is provided with a vertically extending cylindrical boss 26 defining an internally threaded aperture for receiving the elevating screw 27. The lower end of the elevating screw bears against a hardened plate 28 mounted on the base I so that the grinder support arm may be adjusted angularly around the pivot shaft 20. A guide rod 29 extends slidably through the boss 26 and carries an indicator ring 30 adjacent to the upper end of the elevating screw 27. The upper end of the elevating screw is provided with a hand wheel 31.

The center portion of the carriage 8 carries a support bracket 32 having the vertically extending arm 33 formed thereon. The arm 33 carries a circular clamping plate 34 into which is passed a threaded cap screw 35. The screw 35 is arranged to adjustably clamp a second clamping plate 36 formed on the intermediate supporting bracket 37 to the first clamping plate 34. The right hand end of the bracket 37 as viewed in Fig. 1 is provided with a clamping plate 38 disposed at right angles to the plate 36 and carries a similar cap screw extending through a clamping plate 39 formed on the lower end of an upper support bracket 40. The upper arm of the support bracket 40 defines a generally horizontal circular clamping surface 41 arranged to support a tool holding vise 42 in a plurality of angularly adjusted positions.

It will thus be seen that the tool holding vise may be rotated in a horizontal plane by rotation on the supporting face 41 and may be angularly adjusted in a longitudinally extending vertical plane by adjustment of the clamping plate 39 on the clamping plate 38. The vise may be tilted in a transverse vertical plane by adjustment of the clamping plate 36 on the plate 34. The tool holding vise may be reciprocated longitudinally of the machine in any of its adjusted positions by actuation of the lever 16.

The mid-portion of the grinder support arm 23 defines appropriate tapped apertures for receiving the cap screws 43 for securing an electric motor 44 to the support arm. The forward end of the motor shaft rotatably supports a grinding wheel 45 in a plane extending longitudinally of the machine. The motor 44 is enclosed by a hood 46 bolted to the support arm 23 and the hood is provided with a partition plate 47 partially enclosing the end of the motor and shielding the motor from dust and filings thrown off by the grinding wheel.

In operating my machine either as a grinding device or as a cutting device, the work piece is clamped in the vise 42 and the vise adjusted to the desired angular position by adjusting the several clamping plates as previously described. The grinding wheel 45 is then moved vertically into the desired cutting plane by actuation of the hand wheel 31 and moved transversely with respect to the work on the tool vise by actuation of the hand wheel 22. The operator may then reciprocate the carriage 8 and the work piece carried thereby to bring the work piece into operative engagement with the grinding wheel 45. While my machine is particularly well adapted to accurately controlled grinding operations such as the grinding of cutting tools, a small metal saw or a milling disk could obviously be substituted for the grinding wheel.

Vertical adjustment of the boss 26 on the screw 27 actuating the grinder arm as a lever about the shaft 20 moves the wheel 45 extremely accurately with respect to the work holding vise and any work thereon. Transverse adjustment of the grinder support arm 23 is accurately effected on the pivot pin 20. The operator is therefore able to bring the grinding wheel 45 into operative engagement with practically any surface on the work piece. The motor 44 being directly connected to the grinding wheel is adjustable relative to the work piece along with the grinding wheel so there is no opportunity for misalignment between the motor and the grinding tool or no opportunity for slipping in the driving connection to the grinding tool.

I have described a highly practical commercial embodiment of my grinding machine and have not attempted to disclose or describe other possible modified forms of my machine as it is believed persons skilled in the cutting and grinding machine art may make such modifications thereof as may appear desirable without further description.

Having thus described my invention, what I claim as new and desire to secure by Letters Patent, is:

1. In a tool grinding machine having a base provided with longitudinally spaced upstanding ears and a raised pedestal on the opposite side thereof from said ears, a guide rod supported in said ears, a carriage slidable on said rod, an operating lever pivoted to said base and link connected to said carriage, a work holding vise mounted on said carriage and universally adjustable with respect thereto, a yoke secured to said pedestal, a pivot shaft rotatably supported by the arms of said yoke and having threads formed therearound, a hand wheel for said shaft, a grinder supporting arm pivotally mounted on said shaft and having a threaded engagement with the threads on said shaft for adjusting said arm transversely of said machine, a motor carried on said support arm and having a grinding wheel directly connected to the shaft thereof, and a vertical adjusting screw threadedly engaging the free end of said support arm and resting upon a hardened steel plate on said base, said grinding wheel being positioned generally over said work holding vise.

2. In a tool grinding machine having a base provided with longitudinally spaced upstanding ears and a pedestal on the opposite side thereof from said ears, a guide rod supported in said ears, a carriage slidable on said rod, an operating lever pivoted to said base and connected to said carriage, a work holding vise mounted on said carriage and universally adjustable with respect thereto, a yoke secured to said pedestal, a pivot shaft rotatably supported by the arms of said yoke and having threads formed therearound, a hand wheel for said shaft, a grinder supporting arm pivotally mounted on said shaft and having a threaded engagement with the threads on said shaft for adjusting said arm transversely of said machine, a motor carried on said support arm and having a grinding wheel directly connected to the shaft thereof, and a vertical adjusting screw threadedly engaging the free end of said support arm and resting upon said base, said grinding wheel being positioned generally over said work holding vise.

3. In a tool grinding machine having a base provided with longitudinally spaced upstanding ears and a raised pedestal on the opposite side thereof from said ears, the combination of a carriage slidably supported by said ears, a lever pivoted to said base and connected to said carriage, a work holding vise mounted on said carriage for angular adjustment in three planes, a yoke secured to said pedestal, a pivot shaft rotatably supported by the arms of said yoke and having threads formed therearound, a cutter supporting arm pivotally mounted on said shaft and having a threaded engagement with the threads on said shaft for adjusting said arm transversely of said machine, a motor carried on said support arm and having a cutting wheel directly connected to the shaft thereof, and an adjusting screw threadedly engaging the free end of said support arm and resting upon said base.

4. In a tool grinding machine having a base, the combination of a carriage reciprocably mounted on said base, a lever pivoted on said base and adjustably connected to said carriage, a work support adjustably mounted on said carriage, a support member secured to said base, a pivot shaft rotatably supported by said support member and having threads formed therearound, a supporting arm pivotally mounted on said shaft and having a threaded engagement with the threads on said shaft for adjusting said arm transversely of said machine, a motor carried on said support arm and having a grinding wheel directly connected to the shaft thereof, and an adjusting screw threadedly engaging said support arm and resting on said base, said grinding wheel being positioned generally over said work holding vise.

5. In a metal working machine having a base with a longitudinally reciprocable work carrying carriage thereon, the combination of a support member secured to said base and having a transversely extending pivot shaft mounted thereon, said shaft being held against axial movement and having screw threads formed thereon, a support arm pivotally supported on said shaft and engaging the threads thereon for transverse adjustment thereby, an adjusting screw having a threaded engagement with said arm and spaced from said shaft, said screw being arranged to bear against said base, an indicia member positioned around said screw and secured to said base against rotation with said screw, a motor mounted on said arm between said screw and said shaft, and a metal working wheel directly connected to said motor.

6. In a metal working machine having a base with a vertically and transversely adjustable metal working wheel mounted thereon, the combination of a guide rod secured to said base and extending longitudinally thereof, a flat slide rail secured to said base and parallel to said guide rod, a sliding member having a shoe on one end thereof slidably supported on said rail, a guard member secured to said shoe and overhanging said rail, a sleeve on the opposite end of said member positioned around said rod, guard members secured to said sleeve and overhanging said guide rod, a lever pivotally mounted on said base, a link pivotally secured to said sleeve and adjustably secured to said lever, and a work holding vise supported on said slide member and having an adjustable connection thereto for tilting motion in three planes.

EDWARD C. KRUEGER.

REFERENCES CITED

The following references are of record in the file of this patent:

UNITED STATES PATENTS

| Number | Name | Date |
| --- | --- | --- |
| 950,560 | Root | Mar. 1, 1910 |
| 1,229,526 | Ross | June 12, 1917 |
| 1,409,641 | Anderson | Mar. 14, 1922 |
| 1,958,734 | Woodsmall | May 15, 1934 |
| 1,963,394 | Yassenoff | June 19, 1934 |
| 2,333,101 | Greenleaf | Nov. 2, 1943 |